US012757027B2

(12) United States Patent
Lanka et al.

(10) Patent No.: US 12,757,027 B2
(45) Date of Patent: Oct. 6, 2026

(54) DEVICE LOG-OFF ON A DISTRIBUTED PLATFORM

(71) Applicant: QUALCOMM Incorporated, San Diego, CA (US)

(72) Inventors: Sriharsha Lanka, Hyderabad (IN); Krishna Menon, Palakkad (IN); Vinod Kumar Enapakurthi, Vizianagaram (IN); Sai Kousik Swarna, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 18/418,208

(22) Filed: Jan. 19, 2024

(65) Prior Publication Data

US 2025/0240627 A1 Jul. 24, 2025

(51) Int. Cl.
*H04W 12/63* (2021.01)
*H04W 12/06* (2021.01)

(52) U.S. Cl.
CPC ........... *H04W 12/63* (2021.01); *H04W 12/06* (2013.01)

(58) Field of Classification Search
CPC .............................. H04W 12/06; H04W 12/63
See application file for complete search history.

(56) References Cited

U.S. PATENT DOCUMENTS 9,107,075 B1 * 8/2015 Matsuoka ............... G06F 21/35
11,626,901 B2 * 4/2023 Belk ........................ H04B 5/70 455/41.1
2007/0057763 A1 * 3/2007 Blattner .............. G06F 3/03543 340/5.52
2010/0210240 A1 * 8/2010 Mahaffey ................ H04L 41/22 455/411
2012/0003932 A1 * 1/2012 Zhodzishsky ..... H04W 52/0229 455/41.2

(Continued)

OTHER PUBLICATIONS

A. Barua, M. A. Al Alamin, M. S. Hossain and E. Hossain, “Security and Privacy Threats for Bluetooth Low Energy in IoT and Wearable Devices: a Comprehensive Survey,” in IEEE Open Journal of the Communications Society, vol. 3, pp. 251-281, 2022. (Year: 2022).*

(Continued)

*Primary Examiner* — Kari L Schmidt
(74) *Attorney, Agent, or Firm* — AVEK IP, LLC (QUALCOMM)

(57) ABSTRACT

This disclosure provides methods, components, devices, and systems for device security on a wireless communication device. Some aspects, more specifically, relate to wireless communication devices transmitting their respective context states to associated devices within their proximity. The context states can indicate potential security risks associated with the wireless communication devices, respectively. In some aspects, an associated device can receive authorization from a server to transmit a log off request for the wireless communication device. In some aspects, the log off request can be associated with the context state of the device. Upon receiving the authorization, the associated device can transmit the log off request to the device. Once received, the wireless communication device can log off from an operating system associated with the wireless communication device.

30 Claims, 7 Drawing Sheets

(56) References Cited

U.S. PATENT DOCUMENTS

| | | | | |
|---|---|---|---|---|
| 2012/0011237 | A1* | 1/2012 | Bagwandeen | G16H 40/63 726/4 |
| 2014/0157378 | A1* | 6/2014 | Childs | H04L 63/102 726/6 |
| 2014/0282963 | A1* | 9/2014 | Wildermuth | H04W 12/06 726/7 |
| 2015/0067803 | A1* | 3/2015 | Alduaiji | G06F 21/41 726/7 |
| 2016/0337863 | A1* | 11/2016 | Robinson | H04W 4/021 |
| 2020/0026339 | A1* | 1/2020 | Sebastian | H04L 43/16 |
| 2020/0057862 | A1* | 2/2020 | Sabarish | G06F 21/31 |
| 2020/0081922 | A1* | 3/2020 | Li | G06F 16/45 |
| 2020/0120094 | A1* | 4/2020 | Jain | H04L 63/107 |
| 2020/0301720 | A1* | 9/2020 | Choi | G06F 9/4451 |
| 2021/0409953 | A1* | 12/2021 | Balaramn | H04W 12/082 |
| 2022/0046415 | A1* | 2/2022 | Chiang | H04L 63/0853 |
| 2022/0255913 | A1* | 8/2022 | Zacks | H04W 12/065 |
| 2022/0400012 | A1* | 12/2022 | Tran | H04L 9/3231 |
| 2024/0019300 | A1 | 1/2024 | Ayel | |
| 2024/0129300 | A1* | 4/2024 | Baek | H04L 63/10 |
| 2025/0139238 | A1* | 5/2025 | Bar-Ness | G06F 21/84 |

OTHER PUBLICATIONS

F. Meneghello, M. Calore, D. Zucchetto, M. Polese and A. Zanella, “IoT: Internet of Threats? A Survey of Practical Security Vulnerabilities in Real IoT Devices,” in IEEE Internet of Things Journal, vol. 6, No. 5, pp. 8182-8201, Oct. 2019. (Year: 2019).*

* cited by examiner

DEVICE LOG-OFF ON A DISTRIBUTED PLATFORM

TECHNICAL FIELD

This disclosure relates generally to wireless communication, and more specifically, to implementing device authorization techniques for remote log off of devices associated within a distributed platform.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for implementing device authorization techniques for remote log off by a wireless communication device. The method includes transmitting a context state of the wireless communication device to an associated device. The method also includes receiving, from the associated device, a log off request having a pass key authentication associated with a server, where the log off request relates to the context state. The method further includes logging off an operating system associated with the wireless communication device.

In some examples, the context state relates to a login of the operating system associated with the wireless communication device.

In some examples, the server is a distributed context fabric (DCF) server.

In some examples, the wireless communication device transmits the context state via a broadcast using a Bluetooth Low Energy (BLE) transmission.

Another innovative aspect of the subject matter described in this disclosure can be implemented on a wireless communication device. The wireless communication device has a processing system that includes one or more processors and one or more memories coupled with the one or more processors. The processing system is configured to cause the wireless communication device to receive a context state of an associated device. The processing system is also configured to cause the wireless communication device to transmit, to a server, a pass key associated with a log off request, where the log off request relates to the context state of the associated device. The processing system is configured to further cause the wireless communication device to receive, from the server, a pass key authentication for the log off request, and transmit, to the associated device, the log off request associated with the pass key authentication provided by the server.

An additional innovative aspect of the subject matter described in this disclosure can be implemented in a method for implementing device authorization techniques for remote log off by a server. The method includes provisioning a first wireless communication device and a second wireless communication device with a pass key for authenticating and approving action requests between the first wireless communication device and the second wireless communication device. The method also includes receiving, from the first wireless communication device, the pass key associated with a log off request for the second wireless communication device. The method further includes validating the pass key corresponds with the pass key provisioned to the first wireless communication device. The method also includes transmitting a pass key authentication to the first wireless communication device authorizing the log off request.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
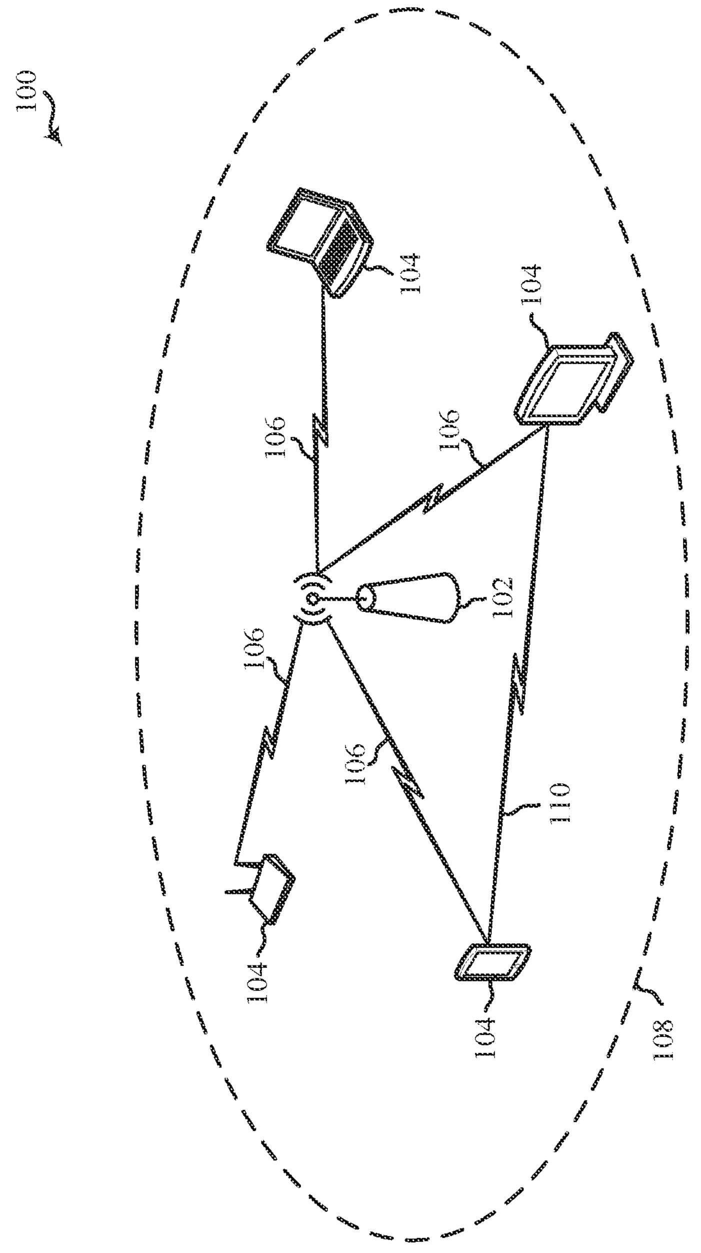
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to device security and, more particularly, to providing device security using wireless communication and authentication using a server on a distributed platform. Devices can be configured to transmit their respective context states to other proximate devices registered with a server. In some aspects, the context state of a device can relate to an inactivity or proximity of the device. These context states, as well as others, can indicate a security risk associated with the device. In some aspects, other proximate and associated devices receiving the context states can be used as proxies to log off devices. In some examples, the log off requests can be associated with the context states indicating potential security risks. In some aspects, upon receiving a context state from a device, a proximate device can transmit a pass key to the server for authorization to transmit a log off request to the device. The server can validate the pass key and transmit a pass key authentication to the proximate device. Upon receiving the pass key authentication, the proximate device can transmit the log off request to the device having the pass key authentication. Once received, the device can log off an operating system associated with the device. As a result, the device can be logged off upon receiving a log off request from the proximate device. In some aspects, the server can be used to associate and provide the devices with their pass key. The server also can authenticate the pass key to authorize a device to alter the state of an associated device.

Particular aspects of the subject matter described in this disclosure can be implemented to realize one or more of the following potential advantages. The present disclosure provides mechanisms that ensure context states of devices are transmitted to other associated and proximate devices. By providing proximate devices with context states of each of the other devices, users of those devices can engage in security measures, including engaging in remote access security measures, such as logging off devices not currently in use. Additionally, mitigating potential security risks associated with logged in devices may result in reducing, or otherwise avoiding, potential security threats such as unauthorized access to unoccupied logged-in devices. Further, the devices may obtain indications associated with the state of other associated and proximate devices and provide notifications related to any potential security risks posed to those devices. Such aspects may improve the response time of security threat mitigation techniques, which may prevent unauthorized use of such devices and reduce potential data breaches.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons"), including the BSSID, to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of the spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands, such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax, and 802.11be standard amendments may be transmitted over the 2.4, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
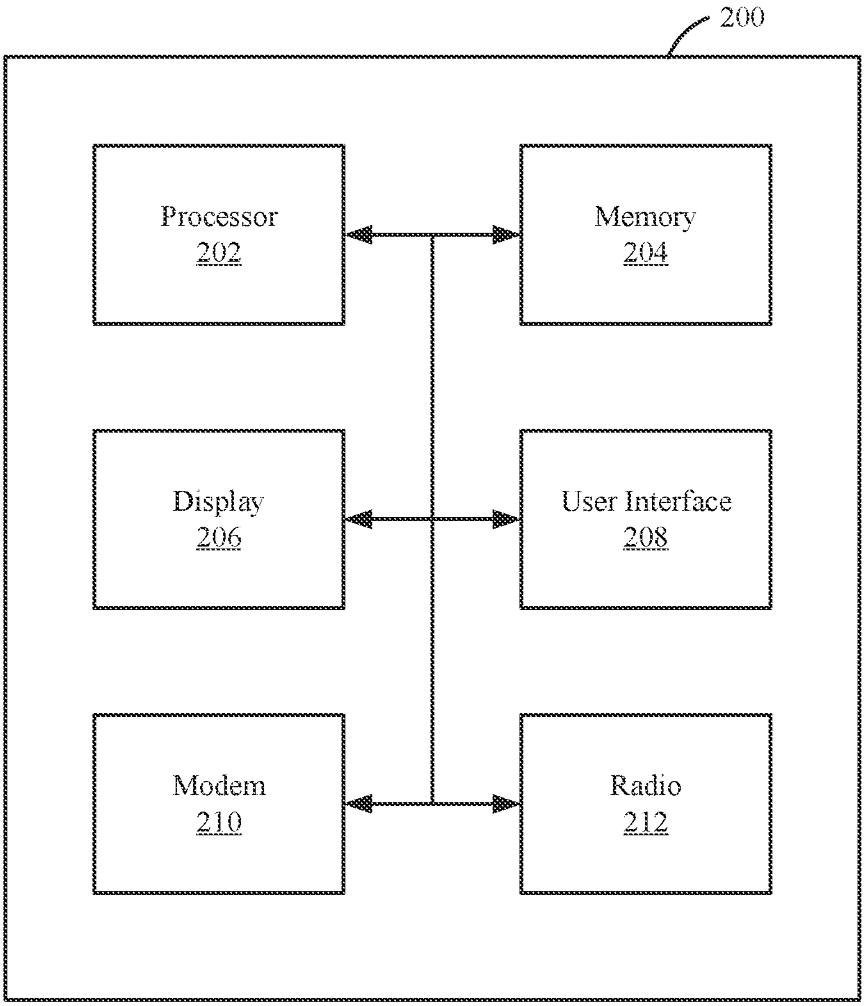
FIG. 2 shows a block diagram of an example wireless communication device that supports improvements of radio transmission traffic efficiency.

FIG. 2 shows a block diagram of an example wireless communication device 200 that supports the security of provisioned devices on a DCF server. In some examples, the wireless communication device 200 is configured to perform the processes 500 and 600 described with reference to FIG. 5 and FIG. 6. The wireless communication device 200 may include one or more chips, SoCs, chipsets, packages, components or devices that individually or collectively constitute or include a processing system. The processing system may interface with other components of the wireless communication device 200, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the device 200 may transmit the information output from the chip. In such an example, the second interface may refer to an interface between the processing system of the chip and a reception component, such that the device 200 may receive information that is then passed to the processing system. In some such examples, the first interface also may obtain information, such as from the transmission component, and the second interface also may output information, such as to the reception component.

The processing system of the wireless communication device 200 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 200 can be configurable or configured for use in an AP, such as the AP 102 described with reference to FIG. 1. In some other examples, the wireless communication device 200 can be an AP that includes such a processing system and other components including multiple antennas. In some examples, the wireless communication device 200 can be configurable or configured for use in an STA, such as the STA 104 described with reference to FIG. 1. In some other examples, the wireless communication device 200 can be an STA that includes such a processing system and other components including multiple antennas.

The wireless communication device 200 is capable of transmitting and receiving wireless communications in the form of, for example, wireless packets or data elements. For example, the wireless communication device 200 can be configurable or configured to transmit and receive packets in the form of physical layer PPDUs and MPDUs conforming to one or more of the IEEE 802.11 family of wireless communication protocol standards. In some other examples, the wireless communication device 200 can be configurable or configured to transmit and receive signals and communications conforming to one or more 3GPP specifications including those for 5G NR or 6G. In some examples, the wireless communication device 200 also includes or can be coupled with one or more application processors which may be further coupled with one or more other memories. In some examples, the wireless communication device 200 further includes at least one external network interface coupled with the processing system that enables communication with a core network or backhaul network that enables the wireless communication device 200 to gain access to external networks including the Internet.

The wireless communication device 200 includes a processor component 202, a memory component 204, and display component 206, a user interface component 208, a modem component 210, and a radio component 212. Portions of one or more of the components 206, 208, 210, and 212 may be implemented at least in part in hardware or firmware. In some examples, at least some of the components 206, 208, 210, and 212 of the device 200 are implemented at least in part by a processor and as software stored in a memory. For example, portions of one or more of the display component 206, the user interface component 208, and the modem component 210 can be implemented as non-transitory instructions (or "code") executable by the processor 202 to perform the functions or operations of the respective module.

In some implementations, the processor 202 may be a component of a processing system. A processing system may generally refer to a system or series of machines or components that receives inputs and processes the inputs to produce a set of outputs (which may be passed to other systems or components of, for example, the device 200). For example, a processing system of the device 200 may refer to a system including the various other components or subcomponents of the device 200, such as the processor, or a transceiver, or a communications manager, or other components or combinations of components of the device 200. The processing system of the device 200 may interface with other components of the device 200 and may process information received from other components (such as inputs or signals) or output information to other components. For example, a chip or modem of the device 200 may include a processing system, a first interface to output information and a second interface to obtain information. In some implementations, the first interface may refer to an interface between the processing system of the chip or modem and a transmitter, such that the device 200 may transmit information output from the chip or modem. In some implementations, the second interface may refer to an interface between the processing system of the chip or modem and a receiver, such that the device 200 may obtain information or signal inputs, and the information may be passed to the processing system. A person having ordinary skill in the art will readily recognize that the first interface also may obtain information or signal inputs, and the second interface also may output information or signal outputs.

The processor 202 is capable of, configured to, or operable to processes information received through the radio 212 and the modem 210, and processes information to be output through the modem 210 and the radio 212 for transmission through the wireless medium. The processor 202 may perform logical and arithmetic operations using program instructions stored within the memory 204. The instructions in the memory 204 may be executable (by the processor 202, for example) to implement the methods described herein. In some examples, the processor 202, together with the memory 204, is capable of or configured to facilitate tuning a scan radio to a channel defined within a first frequency band, transmitting, from the scan radio to a serving radio, a first signal indicating the scan radio is operating on the channel, receiving, by the scan radio, a second signal from the serving radio indicating the serving radio is operating on a second frequency band of the channel, and disabling, by a hardware module associated with the scan radio and the serving radio, a transmission capability of the scan radio on the second frequency band.

The memory 204 is capable of, configured to, or operable to store and communicate instructions and data to and from the processor 202.

The user interface 208 may be any device that allows a user to interact with the wireless communication device 200, such as a keyboard, a mouse, a microphone, et cetera. In aspects, the user interface 208 may be integrated with the display component 206 to present a touchscreen.

The modem 210 is capable of, configured to, or operable to modulate packets and to output the modulated packets to the radio 212 for transmission over the wireless medium. The modem 210 is similarly configured to obtain modulated packets received by the radio 212 and to demodulate the packets to provide demodulated packets.

The radio 212 includes at least one radio frequency transmitter and at least one radio frequency receiver, which may be combined into one or more transceivers. The transmitter(s) and receiver(s) may be coupled to one or more antennas. In some aspects, the processor 202, the memory 204, the modem 210, and the radio 212 may collectively facilitate the wireless communication of the wireless communication device 200 with other wireless communication devices over multiple frequency bands (such as 2.4 GHZ, 5 GHz, or 6 GHz).

Figure 3:
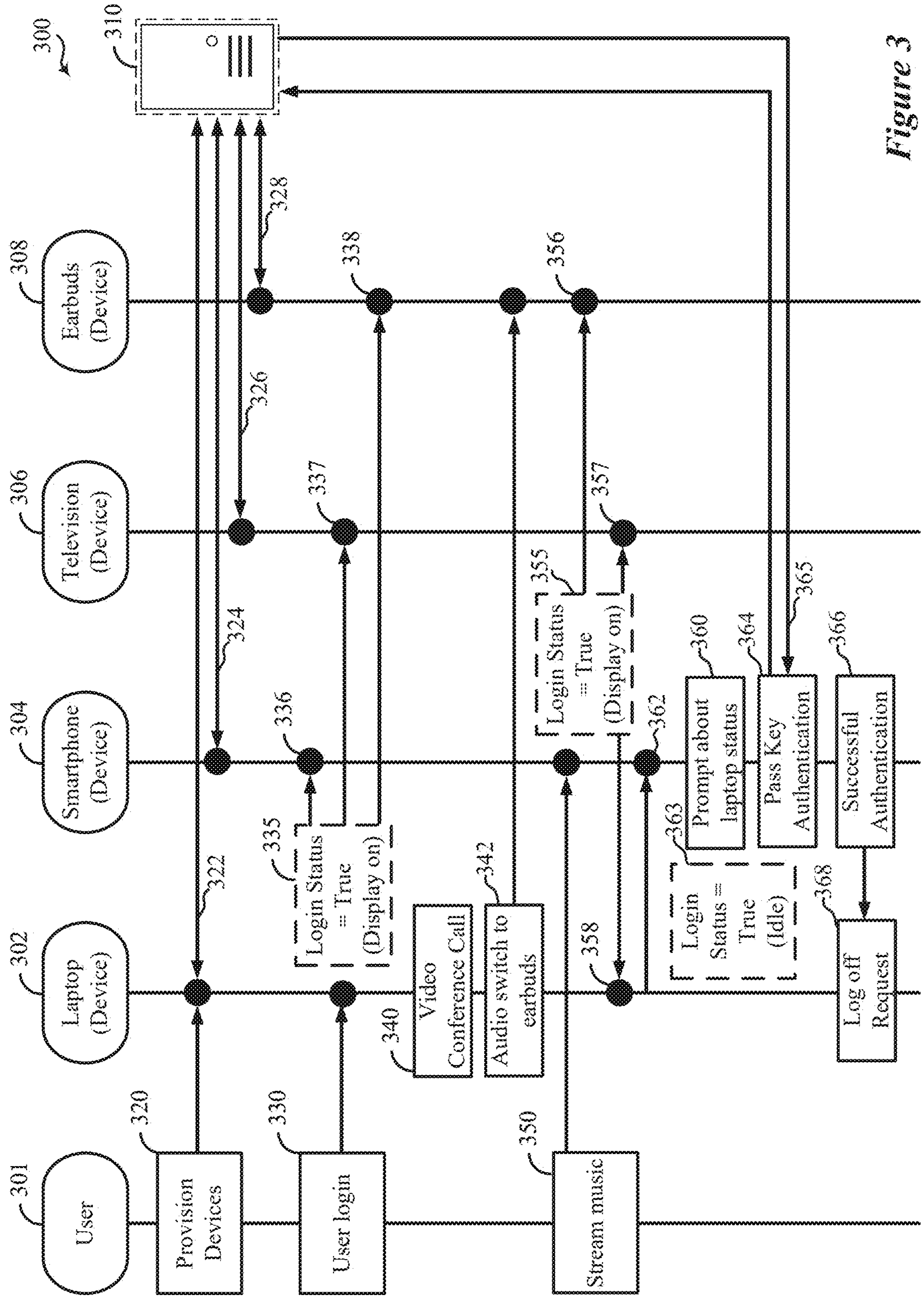
FIG. 3 shows a sequence diagram of an example use case scenario of devices implementing device authorization techniques for remote log-off of other devices provisioned on a server of a distributed platform.

FIG. 3 shows a sequence diagram 300 of an example use case of provisioned devices on a server transmitting their respective context states and the resulting security actions associated with those context states. These security actions include logging off idle devices. According to some aspects, the sequence diagram 300 represents a procedure that can occur to provisioned devices that allow them to transmit their context state to the other provisioned devices while in proximity to each other. Additionally, in some aspects, the sequence diagram 300 illustrates a security measure that can be implemented when a context state of a provisioned device indicates that the device is idle, inactive, or not in use. As shown, the sequence diagram 300 includes a user 301 performing a series of actions across multiple devices. These devices include a laptop 302, a smartphone 304, a television 306, and earbuds 308. While only four devices (302, 304, 306, 308) are shown in FIG. 3, implementations of the present disclosure can include any number of devices capable of provisioning and communication. The sequence diagram 300 also illustrates a server 310 configured to provision the devices together and provide pass key authentication for actions that may result as a response to particular context states of the devices.

In some implementations, the server 310 is a distributed context fabric (DCF) server. Distributed context fabric (DCF) is a platform service that can enable a privacy-preserving network of proximate devices transmitting device context state protected by an account-based security to enable cross-device user experiences and interactions. Devices provisioned on a DCF platform, hosted by a DCF server, can receive particularized information from proximate devices provisioned on the DCF platform.

In some examples, at block 320, the user 301 may initiate a provisioning of devices on the server 310. As shown, the user 301 provisions the laptop 302, the smartphone 304, the television 306, and the earbuds 308. In some implementations, the user 302 can access an interface of the server 310, from the laptop 302, to initiate the provisioning process of the devices. During provisioning, the user 302 can create a new identity and security credentials on the server 310, if one does not already exist. After account creation, cryptographic material can be created that establishes the initial security key the initial hub device (such as the laptop 302) is provisioned with. Provisioned devices that are subsequently added as associated devices can be provided with the security key to allow for pass key authentication. The pass key authentication can authorize the devices, via the server 310, to perform security actions on the other associated devices.

In some examples, the server 310, as part of the provisioning process 322, can allocate a device identification (ID) and add the device, in this instance the laptop 302, to a list of user devices associated with the user 301. Additionally, in some examples, the server 310 can authenticate the user 301, sign the security key, and send a corresponding signed certificate to the laptop 302. The server 310 also can send a global, per-account, symmetric key, or key pass, which the laptop 302 can store locally.

As shown, the user 301 repeats the provisioning on the server 310 for the smartphone 304, the television 306, and the earbuds 308. As part of the provisioning processes 324, 326, 328, the server 310 may associate the laptop 302 with the smartphone 304, the television 306, and the earbuds 308. In some implementations, the server 310 associates and adds the DCF identity and security credentials, generated during the provisioning process 322. to the smartphone 304, the television 306, and the earbuds 308. In some examples, provisioning the devices results in each device 302, 304, 306, 308 being added to the list of user devices associated with the user 301 and each device 302, 304, 306, 308 locally storing the global symmetric key, or key pass, tied to the account created by the user 301. Once provisioned, the laptop 302, the smartphone 304, the television 306, and the earbuds 308 can transmit and share their respective context states with the other devices added to the list of user devices associated with the user 301. In some aspects, transmitting context states can encompass various types of transmission techniques. These techniques include broadcasting, unicasting, multicasting, anycasting, geocasting, and the like.

An exemplary use case, at block 330, the user 301 logs into a user account on the laptop 302. As the laptop 302 is provisioned on the server 310, the laptop 302 broadcasts 336, 337, 338 its context state 335 to the other devices provisioned on the user list. The context state 335 can include the login status of the laptop 302 and also can include the user account information, timestamps, device information, location data, authentication information, security events, session information, browser or app data, event logs, access control lists, user-agent information, cookie information, and the like.

In some examples, a context state of a device can refer to actions occurring on or to the device. These actions include, but are not limited to, user login, application usage, web browsing, file operations, communication, media consumption, system events, security events, web searches, location and GPS data, sensor data, calendar, and scheduling. The context state also can include other contextual information such as time and date information, device battery status and charging events, network connectivity status, device orientation, and the like.

In some implementations, the laptop 302 transmits the context state 335 using a Bluetooth Low Energy (BLE) transmission. The BLE transmission can broadcast context state of the laptop 302 in a small packet of data (such as a data element). In some examples, the laptop 302 can periodically, or at an interval, broadcast its context state 335 as an "advertising packet" on designated advertising channels used by BLE. The other devices provisioned on the server 310 (such as the smartphone 304, the television 306, and the earbuds 308) can scan for context states to discover other devices within their proximity and receive their respective context state. In this instance, the laptop 302 informs the other devices that a user has logged in and is currently active.

At block 340, the laptop 302 initiates a video conference call. In some implementations, the laptop 302 can transmit an updated context state indicating that a video conference call has been initiated, or, more broadly, that an application on the laptop 302 is being used. At block 342, the audio of the video conference call is switched over to the earbuds 308. Similarly, this action can result in another context state transmission from either the laptop 302 and/or the earbuds 308. The context states can indicate an updated usage or initial usage, as is the case for the earbuds 308. The continuous transmission of context states between provisioned devices allows the other devices to monitor the usage of such devices.

At block 350, the user 301 begins to stream music on the smartphone 304 triggering the smartphone 304 to transmit its context state 355. The smartphone 304 can transmit the context state 355 as a broadcast 356, 357, 358 its context state 335 to the other devices provisioned on the user list. In some implementations, the context state 355 can include the login state of the device as well as additional information as described above. In this example, the user 301 actively using the smartphone 304, and is no longer actively using the laptop 302. The result of the inactivity of the laptop 302 causes the laptop 302 to transmit 362 a context state 363 to the smartphone 304 indicating that the laptop 302 is in an idle state. At block 360, an application associated with the distributed platform and server 310 prompts the user 301 that a context state 363 was received, indicating that the laptop 302 is now idle, or inactive. In this example, since the user 301 has transitioned from using the laptop 302 to the streaming music on the smartphone 304, the laptop 302 has become idle and is currently not in use.

In its current state, the laptop 302 is logged in and unlocked, creating a potential security risk for the laptop 302. These security risks include unauthorized access to the device, data theft or loss, identity theft, malware installation, network breach, unauthorized email and social media access, remote access setup, and misuse of computing resources. As an example, an unlocked laptop can be easily accessed by anyone, leading to exposure of personal or sensitive data such as emails, documents, financial information, and login credentials. A malicious individual could copy sensitive data onto a USB drive or upload it to the Internet. There is also a risk of data deletion, either accidentally or intentionally.

As such, at block 360, the user 301 initiates a remedial action by accessing the application associated with the server 310 and transmits a pass key authentication 364 to grant the smartphone 304 with permission to send a log-off request to the laptop 302. The server 310, upon receiving the pass key authentication 364, can validate the pass key by comparing the received key with the pass key provisioned for the smartphone 304. The server 310 can then transmit 365 the pass key authentication 364 to the smartphone 304. At block 366, the smartphone 304 receives authorization from the server 310 that the pass key provided at block 364 matches the pass key it was provided during provisioning.

At block 368, the smartphone 304 transmits a log-off request to the laptop 302, including the pass key authorization 364. In some examples, the log-off request can initiate an automated log-off of the user on the laptop 302. In some implementations, the log-off request 368 enables a lock screen on the laptop that restricts access to the laptop until the user 301 enters their credentials.

Figure 4:
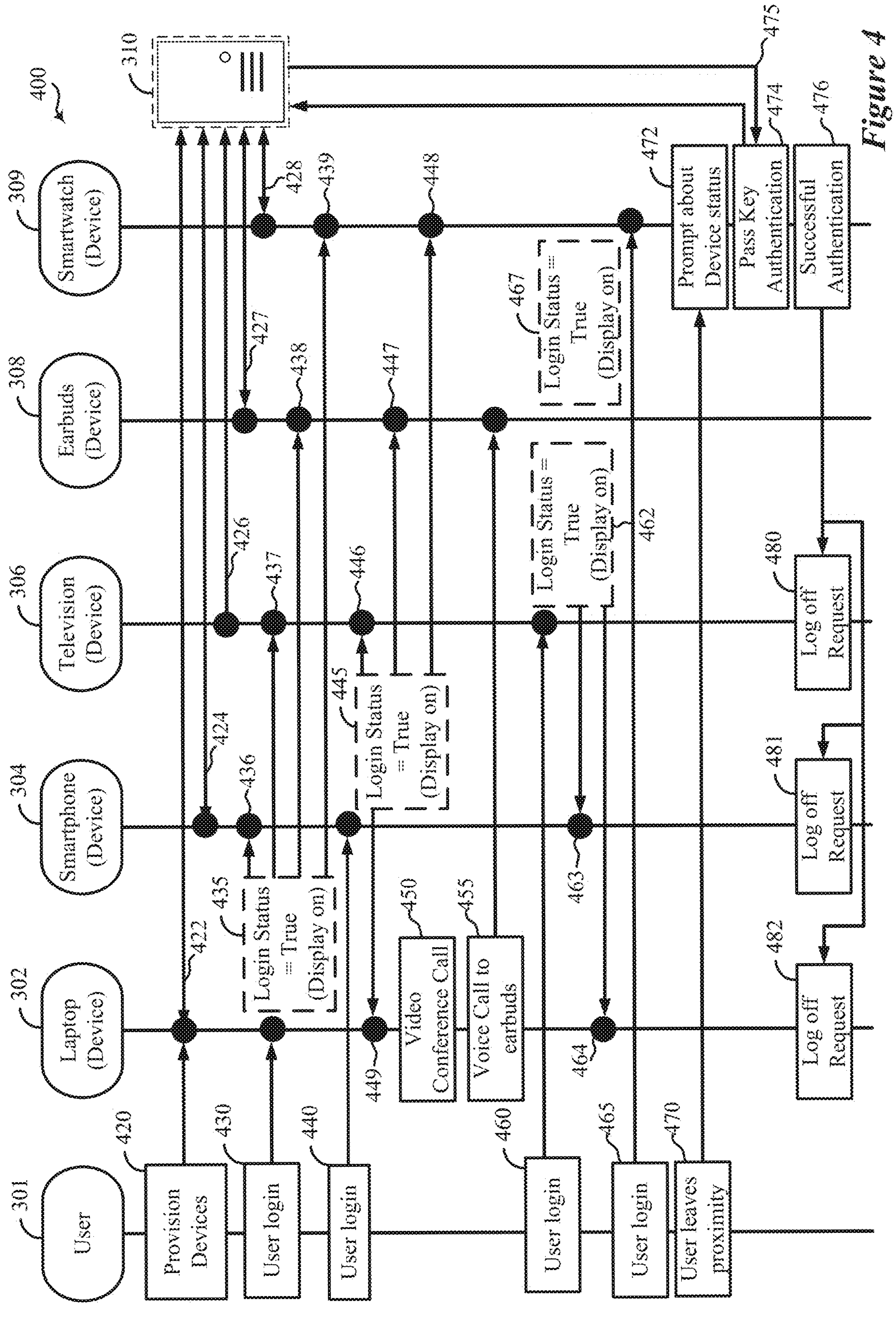
FIG. 4 shows a sequence diagram of an example use case scenario of devices implementing device authorization techniques for remote log-off of other devices provisioned on a server of a distributed platform.

FIG. 4 shows a sequence diagram 400 of another example use case scenario of provisioned devices on a server transmitting their respective context states and security actions resulting from the context states. According to some aspects, the sequence diagram 400 represents an additional procedure that can occur to and by provisioned devices to allow them to transmit their context state to the other provisioned devices while in proximity to each other as well as perform actions in response to those context states. In some aspects, the sequence diagram 400 illustrates a security measure that can be implemented when a context state of a provisioned device indicates that the device is leaving a proximity of other provisioned devices. As shown, the sequence diagram 400 includes a user 301 performing a series of actions across multiple devices. These devices include a laptop 302, a smartphone 304, a television 306, earbuds 308, and a smartwatch 309. While only five devices (302, 304, 306, 308, 309) are shown in FIG. 4, implementations of the present disclosure can include any number of devices capable of provisioning and communication. The sequence diagram 400 also illustrates a server 310 configured to provision the devices together and provide pass key authentication for actions that may respond to particular context states of the devices.

In some implementations, the server 310 is a DCF server. As discussed, DCF is a platform service that can enable a privacy-preserving network of proximate devices transmitting device context state protected by an account-based security to enable cross-device user experiences and interactions. Devices provisioned on a DCF platform, hosted by a DCF server, can receive particularized information from proximate devices provisioned on the DCF platform.

Similar to as previously mentioned in FIG. 3, at block 420, the user 301 can initiate provisioning of devices on the server 310. As shown, the user 301 provisions the laptop 302, the smartphone 304, the television 306, the earbuds 308, and the smartwatch 309. In some examples, the server 310, as part of the provisioning process 422, can allocate a device identification (ID) and add the device, in this instance the laptop 302, to a list of user devices associated with the user 301. As part of the provisioning processes 424, 426, 427, 428, the server 310 may associate the laptop 302 with the smartphone 304, the television 306, the earbuds 308, and the smartwatch 309. In some implementations, the server 310 associates and adds the DCF identity and security credentials, generated during the provisioning process 322, to the smartphone 304, the television 306, the earbuds 308, and the smartwatch 309. In some implementations, the user 302 can access an interface of the server 310 from the laptop 302 to initiate the provisioning process of the devices. During provisioning, the user 302 can create a new identity and security credentials on the server 310 if one does not already exist. In some implementations, the user 302 can create the new identify on a DCF server to create a DCF identity. After account creation, the server 310 can create cryptographic material to provide an initial security key to the hub device (such as the laptop 302).

As previously discussed, provisioning the devices can result in the devices being added to a user list associated with the user 301 on the server 310. Additionally, the compatible devices can be provided with a pass key that can be used to perform actions on the other provisioned devices on the user list.

In this exemplary use case sequence diagram 400, at block 430, the user 301 logs into a user account on the laptop 302. As the laptop 302 is provisioned on the server 310, the laptop 302 transmits 436, 437, 438, 439 its context state 435 to the other devices provisioned on the user list. At block 440, the user 301 logs into the smartphone 304. Similarly, the smartphone 304 transmits 446, 447, 448, 449 its context state 445 which can include the login status of the smartphone 304 as well as other information that can be useful in providing a context state of the smartphone 304.

At block 450, the laptop 302 initiates a video conference call. In some implementations, the laptop 302 can transmit an updated context state indicating that a video conference call has been initiated, or more broadly, that an application on the laptop 302 is in use. At block 455, the audio of the video conference call is switched over to the earbuds 308. Similarly, this action can result in another context state transmission from either the laptop 302 and/or the earbuds 308, indicating an updated usage or initial usage, as is the case for the earbuds 308.

At block 460, the user 301 logs into the television 306. Similarly, the television 306 transmits 463, 464 its context state 462 which can include the login status of the television 306 as well as other information that can be useful in providing a context state of the television 306. At block 465, the user 301 logs into the smartwatch 309. Similarly, the smartwatch 309 transmits its context state 467 which can include the login status of the smartwatch 309 and other information that can be useful in providing a context state of the smartwatch 309.

At block 470, the user 301 leaves a proximity of the laptop 302, the smartphone 304, and the television 306. In some implementations, leaving a proximity may trigger when the smartphone 304 disconnects, or is no longer able to receive or transmit context to the other associated devices 302, 304, 306, 308. This can occur when the smartwatch 309, worn by the user 301, transmits a context state including a GPS location of the device. In some implementations, the proximity range depends on the technology used to broadcast the context state of the devices. As an example, the proximity or range of BLE can vary depending on several factors, such as device hardware, the environment, and the configuration settings. The standard range of BLE-capable devices can have a range of up to 10 meters (about 30 feet), as is common in devices such as smartwatches, fitness trackers, and the like. In some examples, a device may have hardware capable of an extended range of BLE transmission that can achieve ranges up to 100 meters (about 330 feet) or more under ideal conditions. Based on such factors, the proximity of the device can change. An indication the smartwatch 309 has left the proximity of the other devices can be when the smartwatch 309 disconnects from the secure network established between itself and the other devices that allows the transmission of context states between the devices.

Upon the smartwatch 309 leaving the proximity of the other devices, at block 470, an application associated with the distributed platform and the server 310 can prompt the user 301 on the smartwatch 309, indicating that the smartwatch 309 is leaving a proximity of the laptop 302, the smartphone 304, and the television 306. In this example, the user 301 has transitioned from using these other devices and is performing another activity associated with the smartwatch 309. The activity results in the smartwatch 309 leaving the proximity of the other devices.

As such, at block 474 the user 301 initiates a remedial action by accessing the application associated with the server 310 and transmits a pass key authentication 474 to the server 310. The server 310, upon receiving the pass key authentication 474, can validate the pass key by comparing the received key with the pass key provisioned for the smartphone 304. The server 310 can then transmit 475 the pass key authentication 474 to the smartphone 304. The pass key authentication 474 can be associated with an action request to grant the smartwatch 309 with permission to send a log-off request to the laptop 302, the smartphone 304, and the television 306. At block 476, the smartwatch 309 receives authorization from the server 310. The authorization can include authenticating that the pass key provided at block 374 matches the pass key the smartwatch 309 was provided during provisioning.

At blocks 480, 481, and 482, the smartwatch 309 transmits a log off request to the laptop 302, the smartphone 304, and the television 306, including the pass key authorization.

Figure 5:
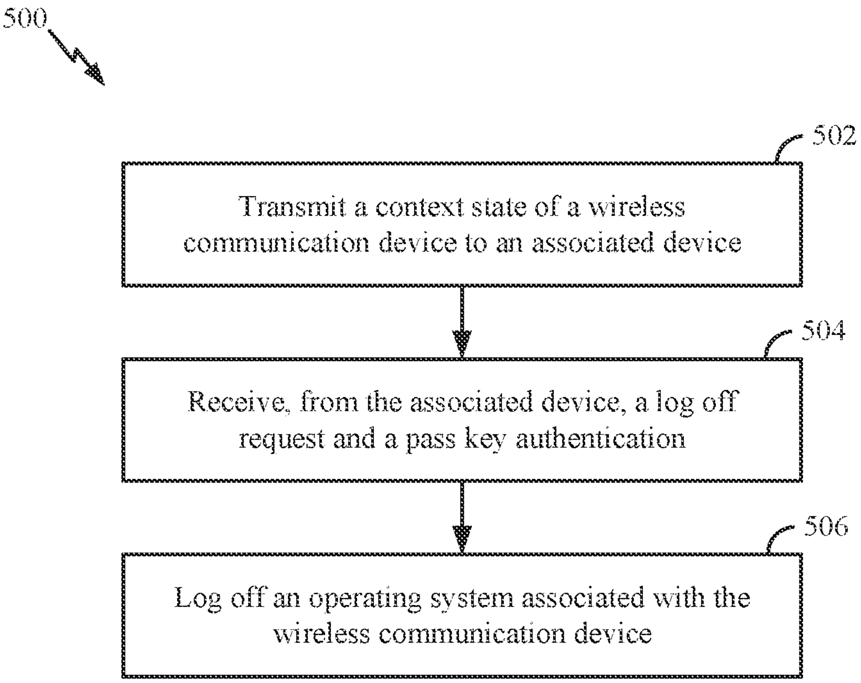
FIG. 5 shows flowchart illustrating an example process performable by or at a wireless communication device that supports device authentication and context state transmission between provisioned devices on a server distributed platform.

FIG. 5 shows a flowchart illustrating an example process 500 performable by or at wireless communication device that supports wireless communication between devices within proximity to each other. The operations of the process 500 may be implemented by a wireless communication device or its components as described herein. For example, the process 500 may be performed by a wireless communication device, such as the wireless communication device 200 described with reference to FIG. 2. In some examples, the process 500 may be performed by a wireless STA such as the one of the STAs 104 described with reference to FIG. 1.

In some examples, the wireless communication device is configured to perform the process 500 described with reference to FIG. 5. In block 502, the wireless communication device transmits a context state of the wireless communication device to an associated device. As described, the context state can refer to actions occurring on or to the device. As an example, the context state can include information indicating that a user has logged into the device. In some implementations, additional information can be included within a data element encapsulating the context state. The additional information can include account information, timestamps, device information, location data, authentication information, and the like. In some implementations, the context state includes the additional information during transmission.

In block 504, the wireless communication device receives from the associated device, a log off request and a pass key authentication. In block 506, the wireless communication device logs off an account associated with an operating system operating on the wireless communication device.

Figure 6:
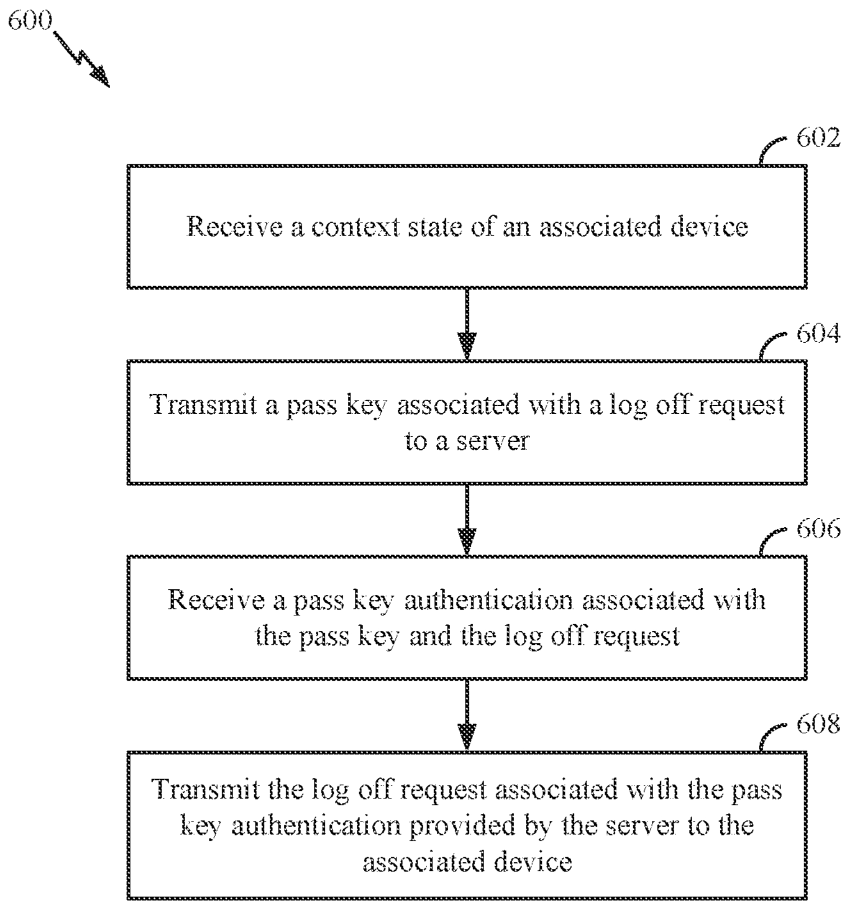
FIG. 6 shows flowchart illustrating an example process performable by or at a wireless communication device that supports device authentication and context state transmission between provisioned devices on a server distributed platform.

FIG. 6 shows a flowchart illustrating an example process 600 performable by or at wireless communication device that supports wireless communication between devices within proximity to each other. The operations of the process 600 may be implemented by a wireless communication device or its components as described herein. For example, the process 600 may be performed by a wireless communication device, such as the wireless communication device 200 described with reference to FIG. 2. In some examples, the process 600 may be performed by a wireless STA such as the one of the STAs 104 described with reference to FIG. 1.

In some examples, the wireless communication device is configured to perform the process 600 described with reference to FIG. 6. In block 602, the wireless communication device receives a transmission a context state of an associated device. In some implementations, the context state indicates an inactivity of the associated device. The inactivity can be the result of no functionality being performed on the associated device, causing the associated device to become idle or inactive. In some implementations, the context state indicates the wireless communication device is leaving a proximity of the associated device. As described above with reference to sequence diagram 400 with reference to FIG. 4, the wireless communication device can transmit its location, which can provide an indication that the device is leaving the proximity of other associated devices.

In some implementations, the context state indicates a required log-off state for the device based on a predetermined schedule. In some examples, the predetermined schedule can be a usage schedule for the device. The usage schedule can define specific hours during which the device can be used. If the wireless communication device, or the associated device, is active outside those hours, a context state can be transmitted, indicating the activity. The predetermined schedule also can include other usage limitations such as time limits for users, maintenance windows, energy-saving windows, task allocations, backup schedules, Internet usage monitoring, work breaks, rotation for shared devices, remote work considerations, educational use restrictions, content restrictions, software-specific access restrictions, and the like.

In block 604, the wireless communication device transmits a pass key to a server to initiate a log off request for the associated device. The log off request can be associated with the context state of the associated device. As described, the context state can indicate a security risk to the device that may require remedial action, such as logging off the device. In some implementations, the server is configured as a DCF server.

In block 606, the wireless communication device receives a pass key authentication from the server indicating an authentication of the pass key provided in the second data element. In block 608, the wireless communication device transmits the log off request and the pass key authentication provided by the server to the second wireless communication device.

Figure 7:
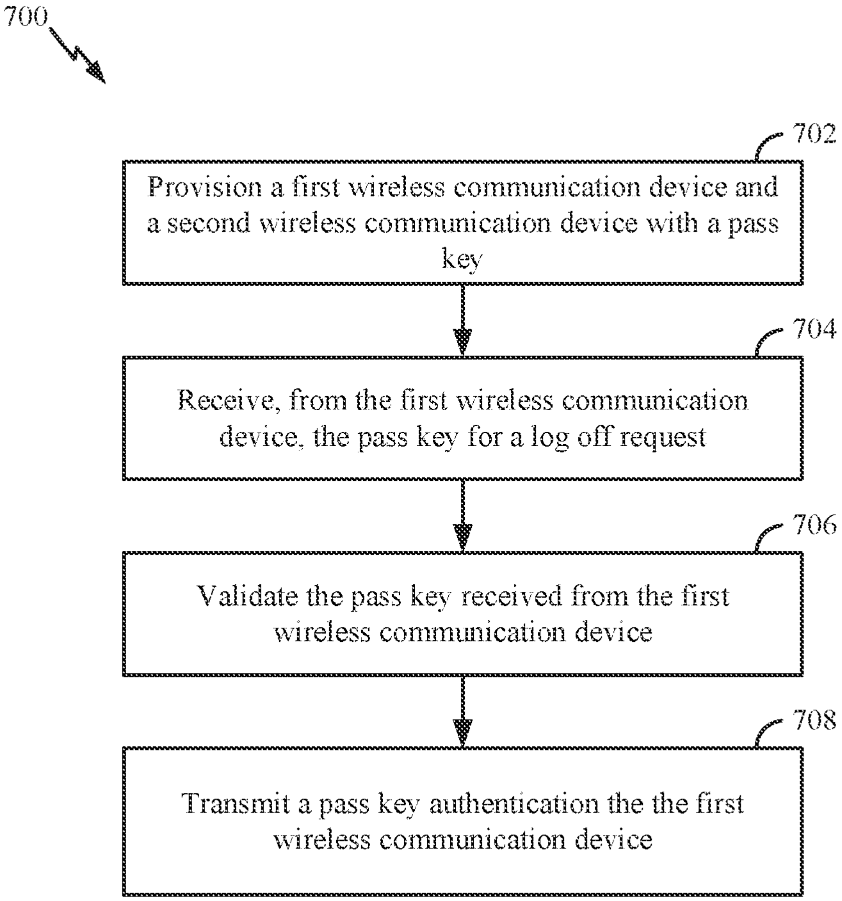
FIG. 7 shows a flowchart illustrating an example server provisioning devices and authorizing action requests of those provisioned devices.

FIG. 7 shows a flowchart illustrating an example process 700 performable by or at a server to support wireless communication between devices within proximity to each other. The operations of the process 700 may be implemented by a server or its components as described herein. For example, the process 700 may be performed by a wireless communication device, such as the wireless communication device 200 described with reference to FIG. 2. In some examples, the process 700 may be performed by a wireless STA such as the one of the STAs 104 described with reference to FIG. 1.

In some examples, the server is configured to perform the process 700 described with reference to FIG. 7. In block 702, the server provisions a first wireless communication device and a second wireless communication device associated with each other with a pass key. As previously described, the pass key can be for authenticating and approving action requests between the first wireless communication device and the second wireless communication device. In some examples, provisioning the first wireless communication device and the second wireless communication device includes adding the devices to a user list associated with a user. In some implementations, the server is a DCF server.

In block 704, the server receives, from the first wireless communication device, a pass key associated with a log off request of the second wireless communication device. In block 706, the server validates the pass key received. In some implementations, the server ensures that the pass key corresponds with the pass key provisioned to the first wireless communication device. Upon validation, in block 706, the server transmits a pass key authentication to the first wireless communication device authorizing the log off request. In some implementations, the server transmits the pass key to an authentication server. As an example, the authentication server can be an open authorization server responsible for authenticating the identity of a user and then authorizing the wireless communication device to transmit the log off request.

Implementation examples are described in the following numbered clauses:

1. A method for wireless communication performable at a wireless communication device, the method including:
   transmitting a context state of the wireless communication device to an associated device;
   receiving, from the associated device, a log off request having a pass key authentication associated with a server, where the log off request relates to the context state; and
   logging off an operating system associated with the wireless communication device.
2. The method of clause 1, where the context state relates to a login of the operating system associated with the wireless communication device.
3. The method of clause 1-2, where the server provides the wireless communication device and the associated device with a pass key for the pass key authentication.
4. The method of clause 1-3, where the wireless communication device is a type of device selected from the group consisting of a laptop, a smartphone, a tablet, a smart watch, and a smart television.
5. The method of clause 1-4, where the log off request is associated with the context state indicating an inactivity on the wireless communication device.
6. The method of clause 1-5, where the log off request is associated with the associated device leaving a proximity of the wireless communication device.
7. The method of clause 1-6, where the log off request is associated with the context state indicating a required log-off state associated with a predetermined schedule of the wireless communication device.
8. The method of clause 1-7, where the context state indicates an activity performed on the wireless communication device.
9. The method of clause 1-8, where the wireless communication device transmits the context state indicating an activity performed on the wireless communication device.
10. The method of clause 1-9, where wherein the wireless communication device and the associated device are proximate to each other.

11. The method of clause 1-10, where the wireless communication device transmits the context via a broadcast using a Bluetooth Low Energy (BLE) transmission.
12. The method of clause 1-11, where the server is a distributed context fabric (DCF) server.
13. The method of clause 1-12, where the wireless communication device and the associated device are provisioned on the server to indicate an association between the devices.
14. A wireless communication device including:
 one or more memories that store processor-executable code; and
 one or more processors coupled with the one or more memories and individually or collectively configured to, in association with executing the code, cause the wireless communication device to:
  receive a context state of an associated device;
  transmit, to a server, a pass key associated with a log off request, wherein the log off request relates to the context state of the associated device;
  receive, from the server, a pass key authentication for the log off request; and
  transmit, to the associated device, the log off request associated with the pass key authentication provided by the server.
15. The wireless communication device of clause 14, where the context state relates to a login of an operating system associated with the associated device.
16. The wireless communication device of clause 14-15, where the server provides the wireless communication device and the associated device with a pass key for the pass key authentication.
17. The wireless communication device of clause 14-16, where the wireless communication device is a type of device selected from the group consisting of a laptop, a smartphone, a tablet, a smart watch, and a smart television.
18. The wireless communication device of clause 14-17, where the log off request is associated with the context state indicating inactivity on the associated device.
19. The wireless communication device of clause 14-18, where the log off request is associated with the wireless communication device leaving a proximity of the associated device.
20. The wireless communication device of clause 14-19, where the log off request is associated with the context state indicating a required log-off state based a predetermined schedule of the associated device.
21. The wireless communication device of clause 14-20, where the context state indicates an activity being performed on the associated device.
22. The wireless communication device of clause 14-21, where the wireless communication device receives the context state of an activity performed on the associated device.
23. The wireless communication device of clause 14-22, where the wireless communication device receives the context state at a continuous interval providing an activity performed on the associated device.
24. The wireless communication device of clause 14-23, where the wireless communication device and the associated device are proximate to each other.
25. The wireless communication device of clause 14-24, where the wireless communication device transmits the log off request using a Bluetooth Low Energy (BLE) transmission to the associated device.
26. The wireless communication device of clause 14-25, where the wireless communication device receives the context state over a BLE transmission from the associated device.
27. A method for wireless communication performable at a server, the method including:
 provisioning a first wireless communication device and a second wireless communication device with a pass key for authenticating and approving action requests between the first wireless communication device and the second wireless communication device;
 receiving, from the first wireless communication device, the pass key associated with a log off request for the second wireless communication device;
 validating the pass key is the pass key provisioned to the first wireless communication device; and
 transmitting a pass key authentication to the first wireless communication device authorizing the log off request.
28. The method of clause 27, where the server is a distributed context fabric (DCF) server.
29. The method of clause 27-28, where provisioning the first wireless communication device and the second wireless communication device includes creating a DCF identity and security credentials for the DCF identity.
30. The method of clause 27-29, where provisioning the first wireless communication device and the second wireless communication device includes adding the first wireless communication device and the second wireless communication device to an existing DCF identity.

As used herein, the term “determine” or “determining” encompasses a wide variety of actions and, therefore, “determining” can include calculating, computing, processing, deriving, investigating, looking up (such as via looking up in a table, a database or another data structure), inferring, ascertaining, measuring, and the like. Also, “determining” can include receiving (such as receiving information), accessing (such as accessing data stored in memory), transmitting (such as transmitting information) and the like. Also, “determining” can include resolving, selecting, obtaining, choosing, establishing and other such similar actions.

As used herein, a phrase referring to “at least one of” a list of items refers to any combination of those items, including single members. As an example, “at least one of: a, b, or c” is intended to cover: a, b, c, a-b, a-c, b-c, and a-b-c. As used herein, “or” is intended to be interpreted in the inclusive sense, unless otherwise explicitly indicated. For example, “a or b” may include a only, b only, or a combination of a and b.

As used herein, “based on” is intended to be interpreted in the inclusive sense, unless otherwise explicitly indicated. For example, “based on” may be used interchangeably with “based at least in part on,” “associated with”, or “in accordance with” unless otherwise explicitly indicated. Specifically, unless a phrase refers to “based on only ‘a,’” or the equivalent in context, whatever it is that is “based on ‘a,’” or “based at least in part on ‘a,’” may be based on “a” alone or based on a combination of “a” and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for wireless communication performable at a wireless communication device, comprising:

transmitting a context state of the wireless communication device to an associated device, the wireless communication device and the associated device being co-provisioned on a server as part of a list of user devices associated with a user and the associated device being proximate to the wireless communication device, wherein the context state relates to an activity associated with the wireless communication device and indicates a security risk associated with the wireless communication device;

receiving, from the associated device, a log off request, the log off request including a pass key authentication received by the associated device from the server in response to a request initiated at the associated device based on the context state indicating the security risk, the pass key authentication having been validated by the server against a pass key provisioned to the associated device during the co-provisioning, the pass key being the same pass key provisioned to the wireless communication device during the co-provisioning; and logging off an operating system associated with the wireless communication device in response to receiving the log off request, including the pass key authentication.

2. The method of claim 1, wherein the context state relates to a login of the operating system associated with the wireless communication device.

3. The method of claim 1, further comprising:

receiving, from the server, a pass key for pass key authentication with the associated device prior to transmitting the context state.

4. The method of claim 1, wherein the wireless communication device is a type of device selected from a group consisting of a laptop, a smartphone, a tablet, a smart watch, and a smart television.

5. The method of claim 1, wherein the log off request is associated with the context state indicating an inactivity on the wireless communication device.

6. The method of claim 1, wherein the log off request is associated with the associated device disconnecting from a secure network.

7. The method of claim 1, wherein the log off request is associated with the context state indicating a required log-off state associated with a predetermined schedule of the wireless communication device.

8. The method of claim 1, wherein the context state indicates an activity performed on the wireless communication device.

9. The method of claim 1, wherein the context state includes an indication of an activity performed on the wireless communication device.

10. The method of claim 1, wherein the wireless communication device transmits the context state within a secure network.

11. The method of claim 1, further comprising:

transmitting the context state via a broadcast using a Bluetooth Low Energy (BLE) transmission.

12. The method of claim 1, further comprising:

provisioning the wireless communication device on the server.

13. The method of claim 12, wherein provisioning the wireless communication device on the server further comprises:

transmitting an identity and security credentials associated with the wireless communication device to the server; and receiving, from the server, a device identification associated with pass key authentication.

14. A wireless communication device comprising:

one or more memories that store processor-executable code; and one or more processors coupled with the one or more memories and individually or collectively configured to, in association with executing the code, cause the wireless communication device to:

receive a context state of an associated device, the associated device being proximate to the wireless communication device and co-provisioned with the wireless communication device on a server as part of a list of user devices associated with a user, the context state relating to an activity associated with the associated device and indicating a security risk associated with the associated device;

transmit, to the server, based on the context state indicating the security risk, a pass key provisioned to the wireless communication device during the co-provisioning, the pass key being the same pass key provisioned to the associated device during the co-provisioning and associated with a log off request, wherein the log off request relates to the context state of the associated device;

receive, from the server, in response to the transmit, a pass key authentication confirming that the pass key matches the pass key provisioned to the wireless communication device during the co-provisioning; and transmit, to the associated device, the log off request including the pass key authentication to cause an operating system associated with the associated device to log off.

15. The wireless communication device of claim 14, wherein the context state relates to a login of an operating system associated with the associated device.

16. The wireless communication device of claim 14, further comprising:

receiving, from the server, a pass key for pass key authentication with the associated device prior to receiving the context state.

17. The wireless communication device of claim 14, wherein the wireless communication device is a type of device selected from a group consisting of a laptop, a smartphone, a tablet, a smart watch, and a smart television.

18. The wireless communication device of claim 14, wherein the log off request is associated with the context state indicating inactivity on the associated device.

19. The wireless communication device of claim 14, wherein the log off request is associated with the associated device disconnecting from a secure network.

20. The wireless communication device of claim 14, wherein the log off request is associated with the context state indicating a required log-off state based a predetermined schedule of the associated device.

21. The wireless communication device of claim 14, wherein the context state indicates an activity being performed on the associated device.

22. The wireless communication device of claim 14, wherein the wireless communication device receives the context state of an activity performed on the associated device.

23. The wireless communication device of claim 14, further comprising:

receiving, at a continuous interval, the context state including an indication of an activity performed on the associated device.

24. The wireless communication device of claim 14, wherein the wireless communication device receives the context state within a secure network.

25. The wireless communication device of claim 14, wherein the wireless communication device transmits the log off request using a Bluetooth Low Energy (BLE) transmission to the associated device.

26. The wireless communication device of claim 14, wherein the wireless communication device receives the context state over a BLE transmission from the associated device.

27. A method for wireless communication performable at a server, comprising:

provisioning a first wireless communication device and a second wireless communication device as part of a list of user devices associated with a user, the first wireless communication device and the second wireless communication device each provisioned with the same pass key for authenticating and approving action requests between the first wireless communication device and the second wireless communication device;

receiving, from the first wireless communication device, the pass key provisioned to the first wireless communication device, the pass key being associated with a log off request for the second wireless communication device, the log-off request being associated with a context state of the second wireless communication device that relates to an activity of the second wireless communication device and indicates a security risk associated with the second wireless communication device, and wherein the second wireless communication device is proximate to the first wireless communication device;

validating the pass key received from the first wireless communication device is the pass key provisioned to the first wireless communication device during the provisioning; and transmitting a pass key authentication to the first wireless communication device authorizing the log off request to be transmitted from the first wireless communication device to the second wireless communication device.

28. The method of claim 27, wherein the server is a distributed context fabric (DCF) server.

29. The method of claim 28, wherein provisioning the first wireless communication device and the second wireless communication device further comprises:

creating a DCF identity; and creating security credentials for the DCF identity.

30. The method of claim 28, wherein provisioning the first wireless communication device and the second wireless communication device further comprises:

adding the first wireless communication device and the second wireless communication device to an existing DCF identity.

* * * * *